Feb. 11, 1941. R. F. BEERS 2,231,243
METHOD OF AND MEANS FOR ANALYZING AND DETERMINING THE GEOLOGIC
STRATA BELOW THE SURFACE OF THE EARTH
Filed June 19, 1939
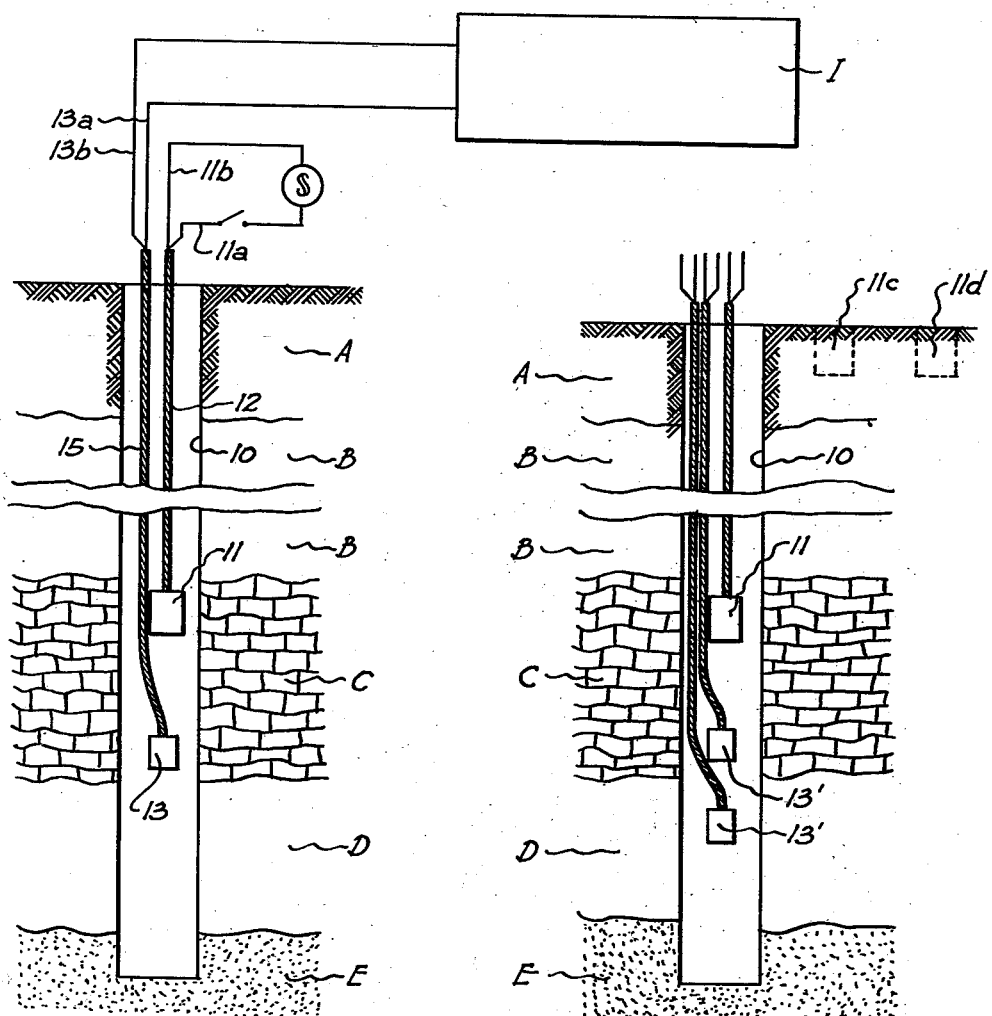
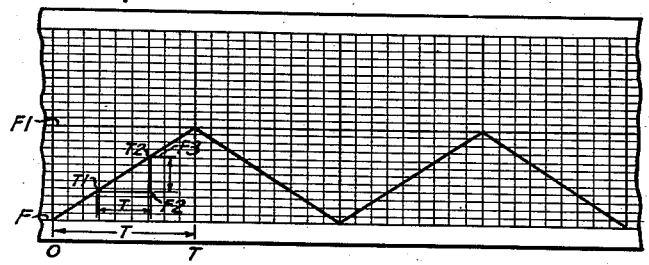
Inventor
Roland F. Beers
Attorney Patented Feb. 11, 1941

2,231,243

UNITED STATES PATENT OFFICE 2,231,243

METHOD OF AND MEANS FOR ANALYZING AND DETERMINING THE GEOLOGIC STRATA BELOW THE SURFACE OF THE EARTH

Roland F. Beers, Dallas, Tex.

Application June 19, 1939, Serial No. 279,840

15 Claims. (Cl. 181—0.5)

This invention relates to new and useful improvements in methods of and means for analyzing and determining the geologic strata below the surface of the earth.

The invention is an improvement on the method and apparatus disclosed in my co-pending application, Serial No. 206,662, filed May 7, 1938.

One object of the invention is to provide an improved method, wherein sound or seismic waves are generated and the velocity of propagation of said waves through the formation is accurately determined, whereby the character of said formation is indicated.

Various seismic methods of geophysical exploration are known at the present time and have been used in actual field practice. In these seismic methods, one of which is disclosed in the above referred to co-pending application, sound waves are generated and transmitted through the formation and the velocity of propagation of said waves is determined. However, it has been found most difficult to accurately measure the velocity of propagation through the relatively thin formations, as for example, those formations having a thickness of only a very few feet. This difficulty is readily comprehended when it is considered that the time required for sound to pass through a formation one foot in thickness, may be as small as 1/20,000 of a second. The present type of measuring means, which is now available, is not sufficiently sensitive to measure these small quantities of time with satisfactory accuracy and, therefore, although the present seismic methods are efficient within certain limits, they are not capable of furnishing complete and accurate information as to all of the subsurface formations encountered.

It is an important object of the invention to provide an improved seismic method of geophysical exploration for measuring small quantities of time with satisfactory accuracy, whereby the velocity of propagation of sound waves through relatively thin formations may be determined and valuable information as to such formations obtained.

A further object of the invention is to provide an improved seismic method of geophysical exploration which permits more accurate measurement of time, whereby all measurements obtained are more accurate, as compared to the present known seismic methods.

A particular object of the invention is to provide an improved seismic method for analyzing and determining the characteristics of subsurface formations, wherein the effect of transient noises and static disturbances, which may be occasioned by the bumping of the instruments against the wall of the bore hole, will not be observed, thereby making it possible to continuously move said instruments through the bore and continuously generate sound to effect measurements without halting or stopping the movement of said instruments, said arrangement permitting a continuous, uninterrupted log or plot of measured characteristics, as a function of the depth of various formations, to be produced.

Still another object of the invention is to continuously generate and transmit sound waves into the formation, the frequency of said waves increasing from a minimum value to a maximum value at a uniform linear rate, after which said frequency decreases at the same rate from such maximum to minimum to complete the cycle; receiving said waves after they have passed through the formation and comparing the frequency of said received waves, as effected by their passage through the formation, with the frequency of the transmitted waves, whereby the time required for said waves to pass through the formation may be accurately determined.

Another object of the invention is to provide an improved apparatus for seismically exploring subsurface formations, which includes means for continuously generating and transmitting sound waves, the frequency of which increases at a uniform linear rate from minimum to maximum value and then decreases at the same rate from maximum to minimum, together with a receiver for receiving the waves after they have travelled through the formation and suitable indicating and measuring instruments for comparing the frequencies of the transmitted waves and the received waves, as relating to time, whereby the velocity of propagation of the sound waves through the formation may be accurately determined.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a diagrammatical view of an apparatus for carrying out the invention, Figure 2 is a graph illustrating the method of measuring time required for the travel of the sound through the formation, and Figure 3 is a view, similar to Figure 1, of a modified form of the invention.

In the drawing, the numeral 10 designates a bore drilled through the subsurface formations or strata of the earth. As shown, the bore extends successively through the weathered layer A, consisting of soil and other unconsolidated material, the layer B of shale, layer C of limestone; a second layer D of shale and, finally, a layer E of sandstone. These layers have been shown symbolically and have been arbitrarily chosen, merely for the purpose of illustration; manifestly, the bore may traverse different types of subsurface strata or formations and the particular locality in which the bore 10 is drilled determines the geologic section encountered.

In carrying out the invention, for the purpose of investigating the various layers, a transmitter in the form of a seismic oscillator or acoustic generator 11 is lowered into the bore on an electric cable 12. The sound generator may take any suitable form, such as an electromagnetic oscillator, of the usual type now in general use, or any other similar electromagnetic oscillator or device, capable of generating sound waves upon the application of a suitable alternating current voltage thereto. The oscillator or sound generator 11 is connected by wires 11a and 11b which are housed within the cable 12, with a suitable A. C. generator, whereby the oscillator is excited by the generator, converting the electrical energy into sound energy. It is noted that the frequency of the sound waves emitted by the generator is varied in a fixed and predetermined manner in definite cycles; that is, the frequency of said waves increases at uniform linear rate from minimum to maximum value, after which it decreases from maximum to minimum value at the same rate. This change in frequency from minimum to maximum and then back to minimum may be termed one cycle, and the cycles are continuously repeated. Thus, the emission of sound waves from the generator is continuous through the observation. Manifestly, when the generator is lowered into the bore 10, it is disposed adjacent to, or in the immediate vicinity of one of the layers of the formation and the sound generated thereby is transmitted into said formation.

It is well known that the velocity of sound travel through formations varies according to the type or character of material encountered. Thus, the velocity of seismic waves travelling through limestone is different than the velocity of said waves travelling through shale, or other formations. By plotting the seismic wave velocity against depth, the abrupt changes which occur when the lithologic character of the beds changes will be apparent, and by a knowledge of the ranges of velocities found for various types of rock, etc., the kind or character of material encountered can be readily determined. Therefore, it is possible to determine the characteristics of the various strata when the velocity of sound travel therethrough is known.

For receiving the sound waves generated by the transmitter 11, a receiver or detector unit 13 is arranged to be lowered through the bore hole 10 in spaced relation to the generator. The receiver or detector may be of any suitable construction as, for example, it may be an electromagnetic instrument capable of receiving the sound waves after they have passed through the formation, as will be explained. The receiver or detector is attached to the lower end of a cable 15 and suitable conductors or wires 13a and 13b extend upwardly through the cable to the surface. The wires are connected to a suitable indicating and measuring apparatus, as will be hereinafter explained. The cable 15 which is attached to the receiver or detector 13, as well as the cable 12, which carries the sound generator or oscillator 11, may be wound on a drum or drums (not shown), whereby lowering of the instruments is facilitated.

In operation, the generator and detector are simultaneously lowered through the bore hole 10 and are preferably spaced a desired distance from each other. The spacing between these elements is subject to variation but, manifestly, by spacing the same close together, the relatively thin strata or formations encountered will not be overlooked. As the instruments are lowered through the bore hole, the A. C. generator is operated to excite the oscillator or sound generator 11 so that sound is generated and transmitted into the subsurface formations which are traversed.

As has been pointed out, the frequency of the sound waves emitted from the sound generator varies in definite and periodic cycles. Each cycle consists of the frequency of the sound waves starting at minimum value and increasing at a uniform linear rate to maximum value; when maximum value is attained, one-half of the cycle is complete, after which the frequency decreases from maximum to minimum at the same rate, thus completing the cycle. The cycle is then repeated and this periodic change continues so long as the generator 11 is operating which is throughout the observations.

The sound emitted from the generator passes through the geologic formation adjacent said generator and after a definite time arrives at the receiver or detector 13. The sound waves received by said receiver or detector induce a voltage therein and this voltage is conducted, through the wires 13a and 13b, to the indicating and measuring apparatus at the surface. This apparatus, indicated by the letter I in Figure 1, compares the induced or received voltage with that being fed to the generator 11 at that particular instant.

Since there is a delay in the transmission of sound from the generator 10 to the receiver or detector, such delay being occasioned by the passage of the sound through the formation, the frequency indicated by the receiver, at any instant, will be somewhat different from that being impressed upon the generator, at the same instant. By suitable means, well known to those versed in the art, the frequency of the receiver may be compared with that of the generator to determine the difference in such frequencies.

It is pointed out that any fluid which may be present in the well bore will not affect the reception of the sound waves travelling to the receiver or detector for it is well known that sound will travel through a formation in situ at a relatively greater velocity than through a column of fluid. Therefore, the generated sound, which passes through the subsurface strata, will reach the receiver 13 prior to the sound travelling through any fluid column in the bore 10 and the efficiency of the apparatus will not be affected by the presence or absence of fluid in the bore.

Any suitable indicating and measuring apparatus may be employed to determine the difference between the frequency of the receiver and frequency of the generator. For example, such determination may be accomplished by the use of a heterodyne system which is illustrated schematically and which is well known to those versed in the art. As explained, the rate, at which the frequency of the generator 11 is changing, is fixed and predetermined and, in view of this, it is readily determined what time interval is represented by the difference in the two frequencies under observation. Such time interval is the amount of time it has required for the sound waves to travel through the formation and, thus, when said time interval is known, the velocity of propagation of the sound waves through said formation is obtained.

In determining the time interval to arrive at the velocity of propagation, reference is made to Figure 2, which illustrates a graph, wherein for the vertical ordinates is plotted the varying frequency of the generator 11 and for abscissae is plotted the time during which the frequency occurs. At zero time on this graph, the frequency is fixed at some value, for example, 100 cycles, as represented by the letter F. At this instant, the frequency begins to increase at a fixed rate until it reaches maximum value, indicated by F1. This increase from minimum value to maximum valve occurs over a time interval of T seconds, at the end of which the frequency decreases to minimum value F, at the same rate. In other words, the same interval of time is required for the frequency to increase from minimum to maximum, as is required to decrease from maximum to minimum. Upon the completion of one cycle, the cycles are repeated continuously throughout the observation.

Since the rate of change of frequencies is linear, any time interval, such as the difference between the points T, and T2 (Figure 2) represents a finite difference in the frequencies indicated by the letters F2 and F3 on the graph. This same difference in frequencies will represent the same time interval, regardless at what mean position of the frequency cycle the measurement is taken. As an example to illustrate, assuming:

F2 equals 800 cycles
F3 equals 900 cycles
F3 minus F2 equals 100 cycles, then
T2 minus T1 equals 1/1000 second Assuming that point F2 equals 400 cycles with F3 equalling 500 cycles, the result would be as follows:

F2 equals 400 cycles
F3 equals 500 cycles
F3 minus F2 equals 100 cycles
T2 minus T1 equals 1/1000 second Thus, it follows that due to the fact that the frequency of the generator varies at a fixed linear rate, it is possible to accurately determine the time interval regardless at what mean position of the frequency cycle the measurement is taken. When the range of time intervals is known which it is desired to measure, then the establishment of an appropriate scale yields measurements of the time according to the requirements.

The distance between the generator 11 and receiver 12 is known and it is possible to accurately determine immediately the actual velocity of the sound travel through the formation by referring the heterodyne frequency observed at each point to the graph shown in Figure 2, thereby obtaining the elapsed time of travel. This time divided into the distance separating the two instruments gives the velocity in feet per second through the geologic section embraced in the path between the generator and receiver. As explained, the velocity varies in accordance with the physical characteristics of the formation and, thus, when the velocity is known, valuable information as to the structure and character of the formation is obtained. It is pointed out that the observed data may be used in any number of ways to aid in geophysical exploration. For example, for the purpose of correlation between wells in a given geologic area, the observed frequency can be plotted as a function of the depth to the formation, and this would yield a distinctive graph which would be easily recognized for the purpose of correlation.

It is noted that the smallest time intervals can be measured, which makes it possible to determine the velocity of sound travel through relatively thin formations. Thus, in exploring a bore hole which traverses several of such relatively thin formations, only a few feet in depth, such formations are indicated and accurate and complete analysis possible. With ordinary seismic methods of exploration, incapable of measuring the small time intervals, it many times occurs that the relatively thin formations are not noted, resulting in inaccurate information. Further, the present method makes it possible to continuously lower the devices through the bore and to take continuous observations because the effect of transient noises and static disturbance occasioned by the contact and bumping of the instruments against the wall of the bore will not be observed. This permits a continuous log or plot to be made and reduces the time required for observations.

In Figure 3, a slightly modified form of the invention is shown. In this form, the generator 11 is located at one position in the well bore and two receivers or detectors 13' are suitably spaced from each other and at a predetermined distance from the generator. With this arrangement, it is possible to determine the amplitudes of the sound waves as they enter and pass through various formations. The efficiency of sound transmission through formations is known to be greatly affected by the condition of fluid saturation in the formation. The absorption of sound is much larger in a porous formation filled with gas than one which is filled with liquid; similarly, a change in sound transmission occurs when the formation is filled with oil, as compared to its being filled with water. These properties and characteristics of the subsurface formations and strata may be derived or indicated from measurements of the velocity of propagation of sound through the formations in situ and by employing the two receivers 13', as illustrated in Figure 3, these various properties and characteristics may be more readily and efficiently determined.

When two receivers or detectors are employed, said detectors may be mounted in a fixed position in the bore, while the generator may be moved from one position to another. Alteration of the spacing between the generator and two receivers affords the transmission of sound by different paths in the formation and provides an opportunity of making a check on the measurements in critical instances. If desired, the generator could be entirely removed from the bore and located at or near the surface of the ground, either directly over the bore hole, or at some horizontal distance therefrom, as illustrated by the dotted lines 11c and 11d in Figure 3. In all forms of the invention, the frequency of the generator is compared to the frequency, or frequencies, of the receiver, or receivers, to measure the elapsed time and thereby determine the velocity of the sound travel through the subsurface formation.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. The method of seismically determining the characteristics of geologic strata traversed by a bore hole which includes, generating sound and directing the same through the subsurface stratum under investigation, whereby the sound waves travel through said stratum, receiving said waves after they have travelled through the formation, and determining the difference between the frequency of the transmitted waves to determine the elapsed time of travel of said waves, whereby the velocity of propagation of said waves is obtained.

2. The method of seismically determining the characteristics of geologic strata traversed by a bore hole which includes, generating sound waves of a predetermined frequency and directing the same through the subsurface formation under investigation, receiving the waves after they have travelled through the formation, and determining the time interval required for said waves to travel through the formation by comparing the frequency of the transmitted waves with the frequency of the received waves, whereby the velocity of propagation of said waves through said formation may be determined.

3. The method of seismically determining the characteristics of geologic strata traversed by a bore hole which includes, generating sound waves which periodically change frequency in a predetermined manner and directing said waves through the subsurface formation under investigation, receiving the waves after they have travelled through the formation, and determining the time interval required for said waves to travel through the formation by comparing the frequency of the transmitted waves with the frequency of the received waves, whereby the velocity of propagation of said waves through said formation may be determined.

4. The method of seismically determining the characteristics of geologic strata traversed by a bore hole which includes, generating sound waves, the frequency of which periodically varies at fixed linear rate, transmitting said waves into the subsurface formation to cause the same to travel therethrough, receiving the waves after they have travelled through the formation, and determining the time interval required for said waves to travel through the formation by comparing the frequency of the transmitted waves with the frequency of the received waves, whereby the velocity of propagation of said waves through said formation may be determined.

5. The method of seismically determining the characteritics of geologic strata traversed by a bore hole which includes, generating sound waves, the frequency of which increases from minimum value to maximum value at a uniform linear rate and then decreases from maximum to minimum at the same rate, to complete one cycle, the cycles being repeated throughout the operation, directing the sound waves into the subsurface formation to cause the same to travel therethrough, receiving the waves after they have travelled through the formation, and determining the time interval required for said waves to travel through the formation by comparing the frequency of the transmitted waves with the frequency of the received waves, whereby the velocity of propagation of said waves through said formation may be determined.

6. The method of seismically determining the characteristics of geologic strata traversed by a bore hole which includes, generating sound waves, the frequency of which increases from minimum value to maximum value at a uniform linear rate and then decreases from maximum to minimum at the same rate, to complete one cycle, the cycles being repeated throughout the operation, directing the sound waves into the subsurface formation to cause the same to travel therethrough, receiving said waves after they have travelled through the formation, determining the difference between the frequency of the transmitted waves and the received waves, and then determining the time interval required for said waves to travel through the formation, whereby the velocity of propagation of said waves through the formation may be obtained.

7. The method of seismically determining the characteristics of geologic strata traversed by a bore hole which includes, generating sound waves in the vicinity of the formation so as to transmit the sound thereinto, the frequency of said sound waves varying periodically at a fixed linear rate, receiving said sound waves after they have travelled through the formation, and determining the time interval required for said waves to travel through the formation by comparing the frequency of the transmitted waves with the frequency of the received waves, whereby the velocity of propagation of said waves through said formation may be determined.

8. The method of seismically determining the characteristics of geologic strata traversed by a bore hole which includes generating sound waves in the vicinity of the formation so as to transmit sound thereinto, the frequency of said waves increasing from minimum to maximum at a uniform linear rate and decreasing from maximum to minimum at the same rate to complete the cycle, the cycles being repeated continuously throughout the operation, receiving said sound waves after they have travelled through the formation, and determining the time interval required for said waves to travel through the formation by comparing the frequency of the transmitted waves with the frequency of the received waves, whereby the velocity of propagation of said waves through said formation may be determined.

9. The method of seismically determining the characteristics of geologic strata traversed by a bore hole which includes, generating sound waves of a predetermined frequency and directing the same through the subsurface formation under investigation, receiving the waves at a plurality of points spaced from the point of transmission after they have travelled through the formation, and determining the time interval required for said waves to travel through the formation by comparing the frequency of the transmitted waves with the frequency of the received waves, whereby the velocity of propagation of said waves through said formation may be determined.

10. The method of seismically determining the characteristics of geologic strata traversed by a bore hole which includes, generating sound waves, the frequency of which increases from minimum value to maximum value at a uniform linear rate and then decreases from maximum to minimum at the same rate, to complete one cycle, the cycles being repeated throughout the operation, directing the sound waves into the subsurface formation to cause the same to travel therethrough, receiving the sound waves after they have passed through the formation at a plurality of points which are spaced from the point of transmission, and determining the time interval required for said waves to traverse the formation by comparing the frequency of the transmitted waves with the frequency of the received waves, whereby the velocity of propagation of said waves may be determined.

11. An apparatus for analyzing subsurface formations including, a sound generator for generating sound waves, the frequency of which varies at a uniform linear rate, said waves being directed through the subsurface formation under investigation, an electrical receiver for receiving said waves after they have travelled through the formation, and means for comparing the frequency of the transmitted waves to the frequency of the received waves to denote the time required for the waves to pass through the formation, whereby the velocity of propagation of said waves may be determined.

12. An apparatus for analyzing subsurface formations including, a sound generator for generating sound waves, the frequency of which increases from minimum to maximum at a uniform linear rate and then decreases from maximum to minimum at the same rate to complete a cycle, the cycles being continuously repeated throughout operation of the generator, said waves being directed through the subsurface formation under investigation, an electrical receiver for receiving said waves after they have travelled through the formation, and means for comparing the frequency of the transmitted waves to the frequency of the received waves to denote the time required for the waves to pass through the formation, whereby the velocity of propagation of said waves may be determined.

13. An apparatus for analyzing subsurface formations including, a sound generator for generating sound waves, the frequency of which varies at a uniform linear rate, said waves being directed through the subsurface formation under investigation, an electrical receiver for receiving said waves after they have travelled through the formation, and a heterodyne system for comparing the frequency of the transmitted waves to the frequency of the received waves to denote the time required for the waves to pass through the formation, whereby the velocity of propagation of said waves may be determined.

14. An apparatus for analyzing subsurface formations including, a sound generator for generating sound waves, the frequency of which varies at a uniform linear rate, said waves being directed through the subsurface formation under investigation, a pair of electrical receivers spaced from each other and from the generator for receiving said waves after they have travelled through the formation, and means for comparing the frequency of the transmitted waves to the frequency of the received waves to denote the time required for the waves to pass through the formation, whereby the velocity of propagation of said waves may be determined.

15. An apparatus for analyzing subsurface formations including, a sound generator for generating sound waves, the frequency of which varies at a uniform linear rate, the generator being arranged to be lowered through a bore adjacent the formation under investigation whereby the sound waves are directed into said formation, an electrical receiver for receiving said waves after they have travelled through the formation, and means for comparing the frequency of the transmitted waves to the frequency of the received waves to denote the time required for the waves to pass through the formation, whereby the velocity of propagation of said waves may be determined.

ROLAND F. BEERS.